(12) United States Patent  
Tatekawa

(10) Patent No.: US 7,056,852 B2  
(45) Date of Patent: Jun. 6, 2006

(54) HIGH-FREQUENCY DIELECTRIC CERAMIC COMPOSITION, DIELECTRIC RESONATOR, DIELECTRIC FILTER, DIELECTRIC DUPLEXER AND COMMUNICATION SYSTEM

(75) Inventor: Tsutomu Tatekawa, Otsu (JP)

(73) Assignee: Murata Manufacturing Co., Ltd. (JP)

( * ) Notice: Subject to any disclaimer, the term of this patent is extended or adjusted under 35 U.S.C. 154(b) by 74 days.

(21) Appl. No.: 10/816,946

(22) Filed: Apr. 5, 2004

(65) Prior Publication Data

US 2004/0214712 A1 Oct. 28, 2004

(30) Foreign Application Priority Data

Apr. 23, 2003 (JP) ............... 2003-118365  
Jul. 18, 2003 (JP) ............... 2003-199170

(51) Int. Cl.  
*C04B 35/468* (2006.01)

(52) U.S. Cl. .................. 501/135; 333/202; 333/219.1

(58) Field of Classification Search ................ 501/135; 333/202, 219, 206, 219.1  
See application file for complete search history.

(56) References Cited

U.S. PATENT DOCUMENTS 4,585,744 A * 4/1986 Konoike et al. ............ 501/135

6,369,669 B1 * 4/2002 Tatekawa et al. ........... 333/134  
6,720,280 B1 * 4/2004 Yamagiwa et al. .......... 501/134  
6,908,872 B1 * 6/2005 Tanaka et al. .............. 501/135

FOREIGN PATENT DOCUMENTS

| EP | 0838446 | * | 4/1998 |
| JP | 61-10806 | | 1/1986 |
| JP | 4-59267 | | 9/1992 |
| JP | 6-74162 | | 9/1994 |
| JP | 7-21970 | | 3/1995 |
| JP | 2965417 | | 8/1999 |

* cited by examiner

*Primary Examiner*—Karl Group  
(74) *Attorney, Agent, or Firm*—Dickstein, Shapiro, Morin & Oshinsky, LLP.

(57) ABSTRACT

A high-frequency dielectric ceramic composition that has a high Q-factor as well as a large relative dielectric constant, and in which temperature coefficient of the resonant frequency ($\tau_f$) can be controlled to around 0 ppm/° C. is provided. The dielectric ceramic composition has a general formula of $Ba[(Sn_\alpha Zr_{1-\alpha})_x Mg_y (Nb_\beta Ta_{1-\beta})_z]_v O_w$, wherein molar ratios x, y, and z are within an area defined by points A (0.30, 0.22, 0.48), B (0.60, 0.12, 0.28), C (0.60, 0.14, 0.26), and D (0.30, 0.25, 0.45) in a ternary diagram, and are not on the line between points A and D, x+y+z=1.00, $0.5 \leq \alpha \leq 1.0$, $0 \leq \beta \leq 1.0$, $0.98 \leq v \leq 1.03$, and w is a positive value to keep the composition electroneutral.

8 Claims, 2 Drawing Sheets

HIGH-FREQUENCY DIELECTRIC CERAMIC COMPOSITION, DIELECTRIC RESONATOR, DIELECTRIC FILTER, DIELECTRIC DUPLEXER AND COMMUNICATION SYSTEM

BACKGROUND OF THE INVENTION

1. Field of the Invention

The present invention relates to a ceramic composition that is used at high frequency regions, such as a microwave region and a millimeter wave region, and to a dielectric resonator, a dielectric filter, a dielectric duplexer, and a communication system that are composed of the ceramic composition.

2. Description of the Related Art

Dielectric ceramics are widely used as components of, for example, dielectric resonators and circuit boards at high frequency regions, such as a microwave region and a millimeter wave region.

When such a high-frequency dielectric ceramic is applied particularly to a dielectric resonator or a dielectric filter, the following characteristics are required:

1) Since wavelengths of electromagnetic waves are reduced by $1/(\in_r)^{1/2}$ in a dielectric with a relative dielectric constant $\in_r$, the relative dielectric constant should be large enough to meet the demand for miniaturization;

2) Dielectric loss should be small, that is, the Q-factor should be high; and

3) Temperature stability of the resonant frequency should be excellent, that is, the temperature coefficient of the resonant frequency ($\tau_f$) should be about 0 ppm/° C.

Known dielectric ceramic compositions of this type include $(Zr, Sn)TiO_4$ (Japanese Examined Patent Application Publication No. 4-59267), $Ba_2Ti_9O_{20}$ (Japanese Unexamined Patent Application Publication No. 61-10806), $Ba(Sn, Zr, Mg, Ta)O_3$ (Japanese Examined Patent Application Publication No. 6-74162), $Ba(Zn, Mg, Ni, Zr, Ta)O_3$ (Japanese Examined Patent Application Publication No. 7-21970), and $Ba(Zr, Mg, Ta)O_3$ (Japanese Patent No. 2965417).

While ceramic compositions of $(Zr, Sn)TiO_4$ or $Ba_2Ti_9O_{20}$ have large relative dielectric constants ($\in_r$) of 36 to 40, they have low Q×f values of 50,000 to 70,000 GHz. Thus, their Q-factors are insufficient for use at high frequencies over 10 GHz. On the other hand, ceramic compositions of $Ba(Sn, Zr, Mg, Ta)O_3$, $Ba(Zn, Mg, Ni, Zr, Ta)O_3$ and $Ba(Zr, Mg, Ta)O_3$ have large relative dielectric constants ($\in_r$) of 20 to 30 and high Q×f values of 100,000 to 250,000 GHz. However, these compositions are based on expensive Ta and are therefore not suitable for commercialization.

In recent years, demands for electronics of low dielectric losses and small sizes have grown. There are also growing demands for dielectric materials with excellent dielectric properties, particularly for inexpensive dielectric materials that have both large relative dielectric constants ($\in_r$) and high Q-factors. However, these demands are not fully satisfied yet.

SUMMARY OF THE INVENTION

Accordingly, it is an object of the present invention to provide an inexpensive high-frequency dielectric ceramic composition that has a relative dielectric constant ($\in_r$) of 20 or more and a Q×f value of 100,000 GHz or more, and in which the temperature coefficient of the resonant frequency ($\tau_f$) can be controlled to around 0 ppm/° C.

Another object of the present invention is to provide a dielectric resonator, a dielectric filter, a dielectric duplexer, and a communication system that comprise the high-frequency dielectric ceramic composition as described above.

To achieve the objectives described above, a high-frequency dielectric ceramic composition of the present invention has a general formula $Ba[(Sn_\alpha Zr_{1-\alpha})_x Mg_y(Nb_\beta Ta_{1-\beta})_z]_v O_w$, wherein molar ratios x, y, and z are within an area defined by points A (0.30, 0.22, 0.48), B (0.60, 0.12, 0.28), C (0.60, 0.14, 0.26), and D (0.30, 0.25, 0.45), and are not on the line between points A and D in a ternary diagram shown in FIG. 1, and x+y+z=1.00, $0.5 \leq \alpha \leq 1.0$, $0 \leq \beta \leq 1.0$, $0.98 \leq v \leq 1.03$, and w is a positive value to keep the composition electroneutral.

Preferably, the molar ratio v is in a range of $1.00 < v \leq 1.02$.

A dielectric resonator according to the present invention is activated by the electromagnetic connection between input/output terminals and a dielectric ceramic that is composed of the high-frequency dielectric ceramic composition.

A dielectric filter according to the present invention includes the dielectric resonator and external junctions that are coupled to the input/output terminals of the dielectric resonator.

A dielectric duplexer according to the present invention includes at least two dielectric filters, input/output connectors that are coupled to each of the dielectric filters, and an antenna connector that is shared by the dielectric filters, at least one of the dielectric filters being the dielectric filter described in the preceding paragraph.

A communication system according to the present invention includes the dielectric duplexer, a transmitting circuit that is coupled to at least one of the input/output connectors of the dielectric duplexer, a receiving circuit that is coupled to at least one of the input/output connectors other than the input/output connector that is coupled to the transmitting circuit, and an antenna that is coupled to the antenna connector of the dielectric duplexer.

By increasing the contents of Sn, Zr, Mg, and/or Nb in the high-frequency dielectric ceramic composition of the present invention, the content of expensive tantalum (Ta) can be reduced or may be zero, and thereby a commercially inexpensive high-frequency dielectric ceramic composition can be prepared.

Thus, dielectric resonators that are mounted in, for example, cellular phones, personal radios, and satellite receivers can be downsized, have low dielectric loss, and have excellent temperature stability of the resonant frequency. Accordingly, such dielectric resonators can be used to manufacture dielectric filters, dielectric duplexers, and communication systems that are small, inexpensive, and have excellent characteristics.

DESCRIPTION OF THE PREFERRED EMBODIMENTS

A dielectric resonator, a dielectric filter, a dielectric duplexer and a communication system that are composed of a high-frequency dielectric ceramic composition of the present invention will be described below.

Figure 2:
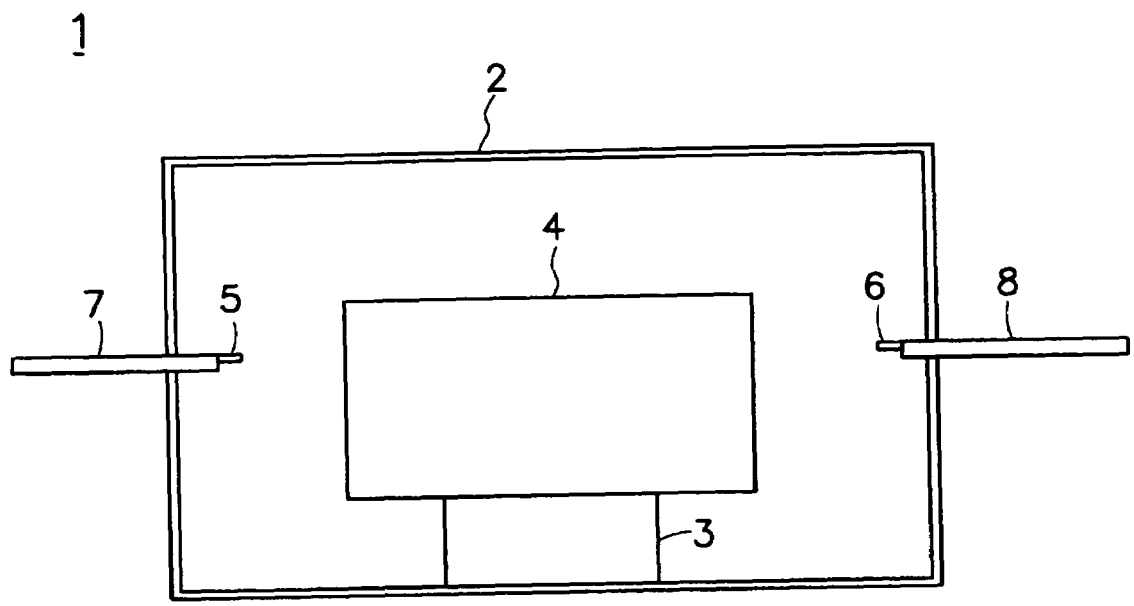
FIG. 2 is a sectional view illustrating a basic structure of a dielectric resonator that is composed of a high-frequency dielectric ceramic composition of the present invention.

FIG. 2 is a sectional view illustrating a basic structure of a dielectric resonator 1 that is composed of a high-frequency dielectric ceramic composition of the present invention. The dielectric resonator 1 includes a metal case 2 in which a columnar dielectric ceramic 4 is mounted on a support 3. A coupling loop 5 functions as an input terminal between a central conductor and an outer conductor of a coaxial cable 7. A coupling loop 6 functions as an output terminal between a central conductor and an outer conductor of a coaxial cable 8. These terminals are held in the metal case 2 while the outer conductor and the metal case 2 are electrically connected. The dielectric ceramic 4 is activated by electromagnetic connection with the input/output terminals. Only a signal with a predetermined frequency from the input terminal is output from the output terminal. The dielectric ceramic 4 in such a dielectric resonator 1 is composed of a high-frequency dielectric ceramic composition of the present invention.

The dielectric resonator 1 shown in FIG. 2 is a TE01δ mode resonator that is used at a base station. The high-frequency dielectric ceramic composition of the present invention can also be applied to dielectric resonators utilizing other TE modes, as well as a TM mode and a TEM mode.

Figure 3:
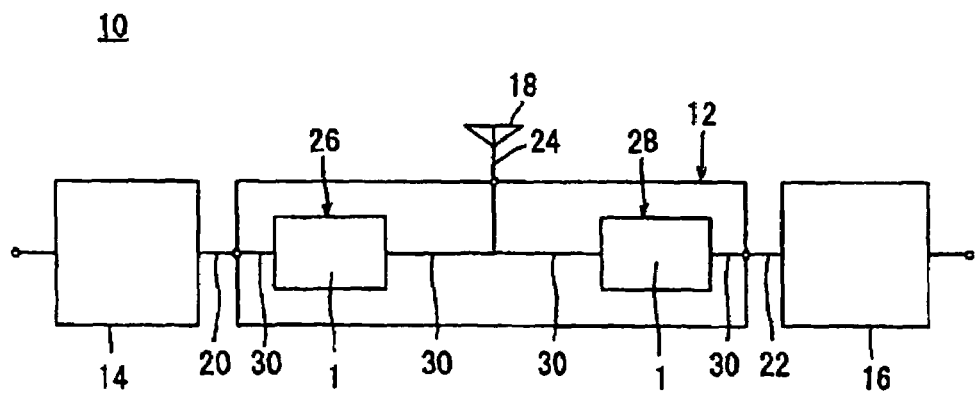
FIG. 3 is a block diagram showing an embodiment of a communication system that includes the dielectric resonator shown in FIG. 2.

FIG. 3 is a block diagram showing an embodiment of a communication system that includes the dielectric resonator 1. The communication system 10 includes a dielectric duplexer 12, a transmitting circuit 14, a receiving circuit 16, and an antenna 18.

The transmitting circuit 14 is coupled to an input connector 20 of the dielectric duplexer 12. The receiving circuit 16 is coupled to an output connector 22 of the dielectric duplexer 12. The antenna 18 is coupled to an antenna connector 24 of the dielectric duplexer 12.

The dielectric duplexer 12 includes two dielectric filters 26 and 28. Each of the dielectric filters 26 and 28 includes the dielectric resonator coupled to external junctions. In the embodiment as shown in FIG. 3, the dielectric filter 26 includes the input terminal 5 of the dielectric resonator 1 coupled to the external junction 30 as shown in FIG. 2, and the dielectric filter 28 includes the output terminal 6 of the dielectric resonator 1 coupled to the external junction 30. The dielectric filter 26 is disposed between the input connector 20 and the dielectric filter 28. The dielectric filter 28 is disposed between the dielectric filter 26 and the output connector 22.

A dielectric ceramic composition that is advantageously used at high frequency regions according to the present invention, for example, the dielectric ceramic 4 that is used in the dielectric resonator 1 in FIG. 2, will now be described.

Figure 1:
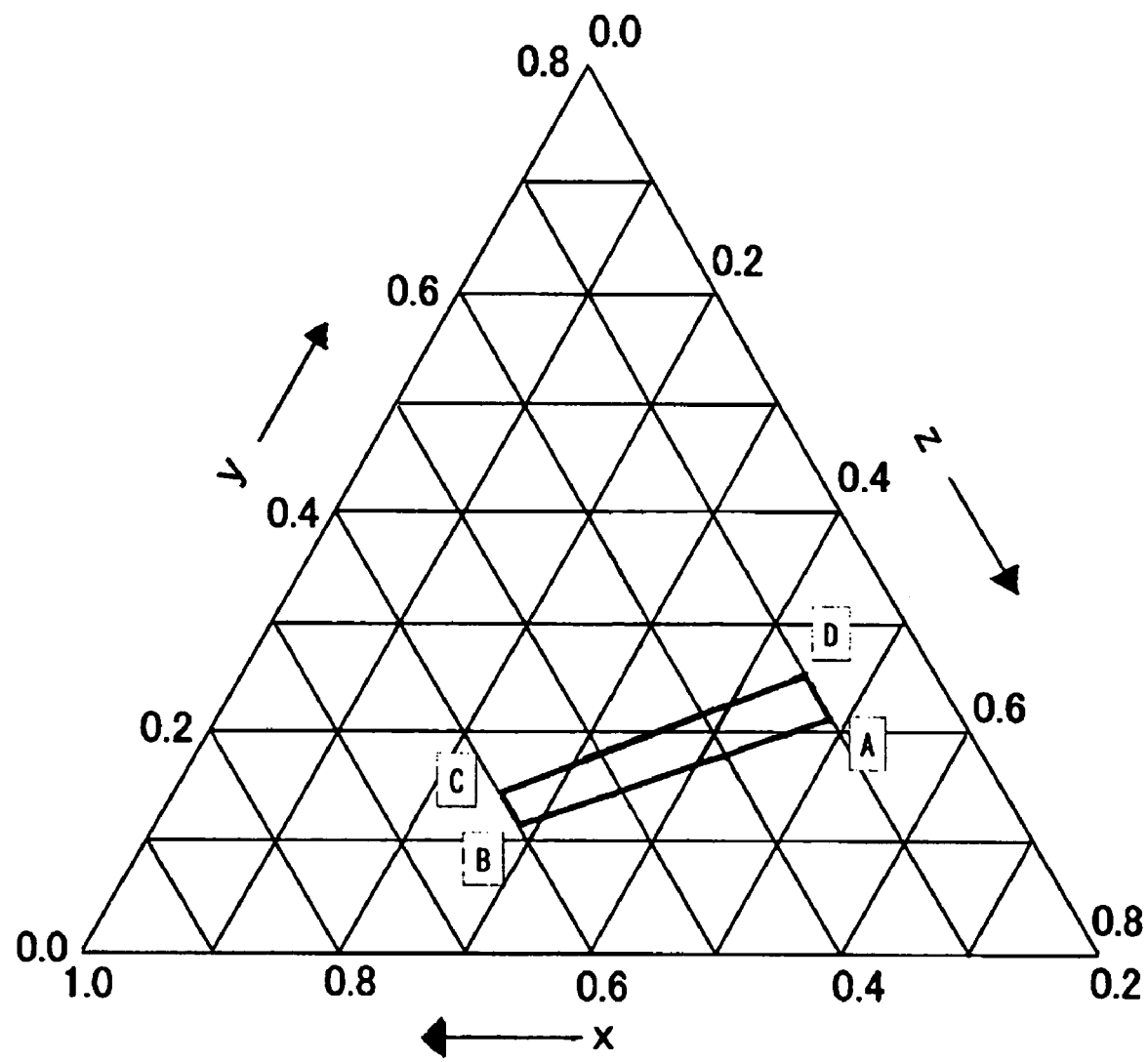
FIG. 1 is a ternary diagram that defines x, y, and z of $[(Sn_\alpha Zr_{1-\alpha})_x Mg_y(Nb_\beta Ta_{1-\beta})_z]$ in a high-frequency dielectric ceramic composition of the present invention.

A high-frequency dielectric ceramic composition of the present invention has a general formula $Ba[(Sn_\alpha Zr_{1-\alpha})_x Mg_y (Nb_\beta Ta_{1-\beta})_z]_v O_w$, wherein the molar ratios x, y, and z are within an area defined by points A (0.30, 0.22, 0.48), B (0.60, 0.12, 0.28), C (0.60, 0.14, 0.26), and D (0.30, 0.25, 0.45), and are not on the line between points A and D in a ternary diagram shown in FIG. 1, and $x+y+z=1.00$, $0.5 \leq \alpha \leq 1.0$, $0 \leq \beta \leq 1.0$, $0.98 \leq v \leq 1.03$, and w is a positive value to keep the composition electroneutral.

Experiments for exemplifying grounds for the specific composition of the present invention will now be described.

TABLE 1

| | $Ba[(Sn_\alpha Zr_{1-\alpha})_x Mg_y (Nb_\beta Ta_{1-\beta})_z]_v O_w$ | | | | | | Relative dielectric constant | Q × f | Temperature coefficient of resonant frequency |
|---|---|---|---|---|---|---|---|---|---|
| Sample | x | y | z | α | β | v | εr | (GHz) | τf (ppm/° C.) |
| 1* | 0.300 | 0.220 | 0.480 | 1.0 | 0.1 | 1.01 | 24.6 | 165,000 | 4 |
| 2* | 0.300 | 0.240 | 0.460 | 1.0 | 0.3 | 1.01 | 24.4 | 168,000 | 5 |
| 3* | 0.300 | 0.250 | 0.450 | 1.0 | 0.1 | 1.01 | 24.7 | 164,000 | 4 |
| 4* | 0.350 | 0.215 | 0.435 | 0.4 | 0.6 | 1.01 | 27.9 | 128,000 | 25 |
| 5 | 0.350 | 0.215 | 0.435 | 0.5 | 0.6 | 1.01 | 27.2 | 141,000 | 18 |
| 6 | 0.350 | 0.215 | 0.435 | 1.0 | 0.6 | 1.01 | 24.1 | 170,000 | −2 |
| 7* | 0.400 | 0.150 | 0.450 | 0.8 | 0.6 | 1.01 | | not sintered | |
| 8 | 0.400 | 0.187 | 0.413 | 0.8 | 0.6 | 1.01 | 25.1 | 144,000 | 5 |
| 9* | 0.400 | 0.200 | 0.400 | 0.4 | 0.5 | 1.01 | 26.6 | 138,000 | 21 |
| 10 | 0.400 | 0.200 | 0.400 | 0.6 | 0.4 | 1.01 | 25.8 | 141,000 | 11 |
| 11 | 0.400 | 0.200 | 0.400 | 0.8 | 0.0 | 1.01 | 24.1 | 183,000 | 0 |
| 12 | 0.400 | 0.200 | 0.400 | 0.8 | 0.1 | 1.01 | 24.0 | 176,000 | 1 |
| 13 | 0.400 | 0.200 | 0.400 | 0.8 | 0.3 | 1.01 | 24.2 | 171,000 | 2 |
| 14* | 0.400 | 0.200 | 0.400 | 0.8 | 0.6 | 0.97 | 24.9 | 64,000 | 3 |
| 15 | 0.400 | 0.200 | 0.400 | 0.8 | 0.6 | 0.98 | 25.0 | 121,000 | 3 |
| 16 | 0.400 | 0.200 | 0.400 | 0.8 | 0.6 | 0.99 | 25.2 | 136,000 | 4 |
| 17 | 0.400 | 0.200 | 0.400 | 0.8 | 0.6 | 1.00 | 25.2 | 150,000 | 4 |
| 18 | 0.400 | 0.200 | 0.400 | 0.8 | 0.6 | 1.01 | 25.2 | 160,000 | 4 |
| 19 | 0.400 | 0.200 | 0.400 | 0.8 | 0.6 | 1.02 | 25.1 | 158,000 | 4 |
| 20 | 0.400 | 0.200 | 0.400 | 0.8 | 0.6 | 1.03 | 25.2 | 142,000 | 4 |
| 21* | 0.400 | 0.200 | 0.400 | 0.8 | 0.6 | 1.04 | 25.3 | 83,000 | 4 |
| 22 | 0.400 | 0.200 | 0.400 | 0.8 | 0.7 | 1.01 | 23.7 | 166,000 | 5 |
| 23 | 0.400 | 0.200 | 0.400 | 1.0 | 0.6 | 1.01 | 23.7 | 166,000 | −5 |
| 24 | 0.400 | 0.200 | 0.400 | 1.0 | 0.8 | 1.01 | 24.4 | 155,000 | 4 |
| 25 | 0.400 | 0.200 | 0.400 | 1.0 | 1.0 | 0.99 | 25.4 | 122,000 | 0 |
| 26 | 0.400 | 0.200 | 0.400 | 1.0 | 1.0 | 1.00 | 25.2 | 133,000 | 0 |
| 27 | 0.400 | 0.200 | 0.400 | 1.0 | 1.0 | 1.02 | 25.1 | 142,000 | 0 |
| 28 | 0.400 | 0.213 | 0.387 | 0.8 | 0.6 | 1.01 | 24.5 | 159,000 | 1 |

TABLE 1-continued

| | $Ba[(Sn_\alpha Zr_{1-\alpha})_x Mg_y (Nb_\beta Ta_{1-\beta})_z]_v O_w$ | | | | | | Relative dielectric constant | Q × f | Temperature coefficient of resonant frequency |
|---|---|---|---|---|---|---|---|---|---|
| Sample | x | y | z | α | β | v | εr | (GHz) | τf (ppm/° C.) |
| 29* | 0.400 | 0.240 | 0.360 | 0.8 | 0.6 | 1.01 | 24.0 | 68,000 | 0 |
| 30* | 0.500 | 0.125 | 0.375 | 0.8 | 0.6 | 1.01 | | not sintered | |
| 31 | 0.500 | 0.150 | 0.350 | 0.8 | 0.6 | 1.01 | 24.1 | 118,000 | 3 |
| 32* | 0.500 | 0.160 | 0.340 | 0.4 | 0.6 | 1.01 | 26.8 | 110,000 | 22 |
| 33 | 0.500 | 0.160 | 0.340 | 0.5 | 0.4 | 1.00 | 26.0 | 124,000 | 13 |
| 34 | 0.500 | 0.160 | 0.340 | 0.6 | 0.0 | 1.02 | 25.1 | 123,000 | 4 |
| 35 | 0.500 | 0.160 | 0.340 | 0.8 | 0.6 | 1.01 | 24.2 | 139,000 | 3 |
| 36 | 0.500 | 0.160 | 0.340 | 1.0 | 0.6 | 1.01 | 22.5 | 141,000 | −7 |
| 37 | 0.500 | 0.160 | 0.340 | 1.0 | 1.0 | 1.01 | 23.7 | 130,000 | −4 |
| 38 | 0.500 | 0.177 | 0.323 | 0.8 | 0.6 | 1.01 | 23.4 | 131,000 | 1 |
| 39* | 0.500 | 0.200 | 0.300 | 0.8 | 0.6 | 1.01 | 23.0 | 8,000 | 2 |
| 40 | 0.600 | 0.120 | 0.280 | 1.0 | 0.8 | 1.01 | 22.0 | 102,000 | −6 |
| 41 | 0.600 | 0.132 | 0.268 | 1.0 | 0.8 | 1.01 | 22.0 | 108,000 | −6 |
| 42 | 0.600 | 0.140 | 0.260 | 1.0 | 0.8 | 1.01 | 22.0 | 103,000 | −5 |
| 43* | 0.700 | 0.100 | 0.200 | 0.9 | 0.5 | 1.00 | 21.9 | 62,000 | −8 |

Powders of high-purity barium carbonate ($BaCO_3$), tin oxide ($SnO_2$), zirconium oxide ($ZrO_2$), magnesium carbonate ($MgCO_3$), niobium oxide ($Nb_2O_5$), and tantalum oxide ($Ta_2O_5$) were prepared as starting materials of $Ba[(Sn_\alpha Zr_{1-\alpha})_x Mg_y (Nb_\beta Ta_{1-\beta})_z]_v O_w$. These powders were mixed to prepare ceramic compositions shown in Table 1. Then, these powders were wet-blended in a ball mill for 16 hours. The resulting mixtures were dehydrated and dried.

The mixtures were then calcined at a temperature of 1000 to 1300° C for 3 hours. An adequate amount of binder was added to each calcined powder and the mixtures were wet-ground in a ball mill for 16 hours to yield compounded powders.

Then, the compounded powders were pressed into discs at a pressure from 1000 to 2000 kg/cm² and were fired at a temperature of 1500 to 1600° C. for 4 to 10 hours in the atmosphere to form sintered compacts with a diameter of 8.5 mm and a thickness of 4.2 mm.

Each of the resulting sintered compacts was subjected to measurements of the relative dielectric constant ($\epsilon_r$) and Q-factor by a parallel-plate dielectric resonator method at a frequency (f) range from 10 to 11 GHz. The results were converted into Q×f values. The temperature coefficient of the resonant frequency ($\tau_f$) at a temperature between 25 and 55° C. was determined from a resonant frequency in the TE01δ mode.

Table 1 shows the relative dielectric constant ($\epsilon_r$), the Q×f value, and the temperature coefficient of the resonant frequency ($\tau_f$). Samples with asterisks are not within the scope of the present invention.

The reason why the composition range is selected for the high-frequency dielectric ceramic composition will now be described.

In the inventive composition, as is demonstrated by comparison among samples 4 to 6, the temperature coefficient of the resonant frequency ($\tau_f$) tends to decrease with an increase in the molar ratio α of Sn. However, compositions with molar ratios of x, y and z on the line between points A and D, or outside the line between points A and D in the ternary diagram shown in FIG. 1 (for example, compositions with x≦0.30 in samples 1 to 3), cannot achieve $\tau_f$≦0 ppm/° C. even for α=1.0. Therefore, these compositions are not suitable because $\tau_f$ cannot be adjusted to around 0 ppm/° C.

Furthermore, the composition sample 43 with x>0.60, which is located outside the line between points B and C, has a Q×f value less than 100,000 GHz and is undesirable.

Compositions outside the line between points A and B, such as samples 7 and 30, exhibit insufficient sintering and are undesirable.

Compositions outside the line between points C and D, such as samples 29 and 39, have Q×f values less than 100,000 GHz and are undesirable.

Since $\tau_f$ undesirably exceeds 20 ppm/° C. at α<0.5, as in samples 4, 9 and 32, (α must be in a range of 0.5≦α≦1.0.

Since Q×f values undesirably fall below 100,000 GHz at v<0.98 as in sample 14 or at v>1.03 as in sample 21, v is preferably in a range of 0.98≦v≦1.03. As demonstrated by comparison among samples 17 to 20, v in a range of 1.00<v≦1.02 gives a higher Q×f value and is most preferable.

In addition, the high-frequency dielectric ceramic composition of the present invention may contain small amounts of impurities that do not impair the object of the present invention. For example, about 0.01 to 0.50% by weight of ZnO, NiO, $Fe_2O_3$, $Cr_2O_3$, $B_2O_3$, $Al_2O_3$, $SiO_2$, $MnO_2$, $Sb_2O_5$, $WO_3$, or the like will not greatly affect the characteristics of the dielectric ceramic.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A dielectric resonator comprising:
   a dielectric ceramic; and
   input/output terminals electromagnetically connected with the dielectric ceramic, the dielectric ceramic comprising a high-frequency dielectric ceramic composition represented by a general formula:
   $Ba[(Sn_\alpha Zr_{1-\alpha})_x Mg_y (Nb_\beta Ta_{1-\beta})_z]_v O_w$,
   wherein molar ratios of x, y and z are within an area in a ternary diagram defined by a first point A (where x=0.30, y=0.22, and z=0.48), a second point B (where x=0.60, y=0.12, and z=0.28), a third point C (where x=0.60, y=0.14, and z=0.26), and a fourth point D (where x=0.30, y=0.25. and z=0.45), and is the molar ratios of x, y and z are not on a line between points A and D, $x+y+z=1.00$, $0.5 \leq \alpha \leq 1.0$, $0 \leq \beta \leq 1.0$, $0.98 \leq v \leq 1.03$, and w is a positive value to keep the composition electroneutral.

2. A dielectric resonator comprising:

a dielectric ceramic; and input/output terminals electromagnetically connected with the dielectric ceramic, the dielectric ceramic comprising high-frequency dielectric ceramic composition represented by a general formula:

$$Ba[(Sn_\alpha Zr_{1-\alpha})_x Mg_y (Nb_\beta Ta_{1-\beta})_z]_v O_w,$$

wherein molar ratios of x, y and z are within an area in a ternary diagram defined by a first point A (where x=0.30, y=0.22, and z=0.48), a second point B (where x=0.60, y=0.12, and z=0.28), a third point C (where x=0.60, y=0.14, and z=0.26), and a fourth point D (where x=0.30, y=0.25, and z=0.45), and is the molar ratios of x, y and z are not on a line between points A and D, $x+y+z=1.00$, $0.5 \leq \alpha \leq 1.0$, $0 \leq \beta \leq 1.0$, $1.00 \leq v \leq 1.02$, and w is a positive value to keep the composition electroneutral.

3. dielectric filter comprising:

the dielectric resonator according to claim 1; and external junctions that are coupled to the input/output terminals of the dielectric resonator.

4. A dielectric filter comprising:

the dielectric resonator according to claim 2; and external junctions that are coupled to the input/output terminals of the dielectric resonator.

5. A dielectric duplexer comprising:

at least two dielectric filters;

input/output connectors that are coupled to each of the at least two dielectric filters; and an antenna connector that is shared by the at least two dielectric filters, wherein at least one of the at least two dielectric filters is the dielectric filter according to claim 3.

6. A dielectric duplexer comprising:

at least two dielectric filters;

input/output connectors that are coupled to each of the at least two dielectric filters; and an antenna connector that is shared by the at least two dielectric filters, wherein at least one of the at least two dielectric filters is the dielectric filter according to claim 4.

7. A communication system comprising:

the dielectric duplexer according to claim 5;

a transmitting circuit that is coupled to at least one of the input/output connectors of the dielectric duplexer;

a receiving circuit that is coupled to at least one of the input/output connectors other than the input/output connector that is coupled to the transmitting circuit; and an antenna that is coupled to the antenna connector of the dielectric duplexer.

8. A communication system comprising:

the dielectric duplexer according to claim 6;

a transmitting circuit that is coupled to at least one of the input/output connectors of the dielectric duplexer;

a receiving circuit that is coupled to at least one of the input/output connectors other than the input/output connector that is coupled to the transmitting circuit; and an antenna that is coupled to the antenna connector of the dielectric duplexer.

* * * * *